(12) United States Patent
Liedhegner et al.

(10) Patent No.: US 10,230,088 B1
(45) Date of Patent: Mar. 12, 2019

(54) BATTERY ELECTRODE ASSEMBLY, SEPARATOR AND METHOD OF MAKING SAME

(71) Applicant: Johnson Controls Technology Company, Holland, MI (US)

(72) Inventors: Joseph E. Liedhegner, Wauwatosa, WI (US); Wilson Sturm Filho, Soracaba (BR); Eduardo J. Arenas, Monterrey Neuvo Leon (MX); James S. Symanski, Greenfield, WI (US); Feng Xue, Menomonee Falls, WI (US)

(73) Assignee: Johnson Controls Technology Company, Milwaukee, WI (US)

( * ) Notice: Subject to any disclaimer, the term of this patent is extended or adjusted under 35 U.S.C. 154(b) by 492 days.

(21) Appl. No.: 14/609,936

(22) Filed: Jan. 30, 2015

(51) Int. Cl.
  H01M 2/00 (2006.01)
  H01M 2/16 (2006.01)
  H01M 2/18 (2006.01)

(52) U.S. Cl.
  CPC .......... *H01M 2/1673* (2013.01); *H01M 2/18* (2013.01)

(58) Field of Classification Search
  CPC ............. H01M 2/00; H01M 2/16; H01M 2/18
  See application file for complete search history.

(56) References Cited

U.S. PATENT DOCUMENTS

| | | | |
|---|---|---|---|
| 5,281,493 A | 1/1994 | Jones | |
| 5,389,463 A | 2/1995 | Chang et al. | |
| 5,424,144 A | 6/1995 | Woods, Jr. | |
| 5,547,779 A | 8/1996 | Kishimoto et al. | |
| 5,679,479 A | 10/1997 | Young et al. | |
| 5,716,734 A | 2/1998 | Nakano | |
| 5,789,103 A | 8/1998 | Young et al. | |
| 5,894,055 A | 4/1999 | Young et al. | |
| 5,985,484 A | 11/1999 | Young et al. | |
| 6,040,076 A | 3/2000 | Reeder | |
| 6,132,899 A | 10/2000 | Young et al. | |
| 6,309,776 B1 | 10/2001 | Okajima et al. | |
| 6,376,126 B1 | 4/2002 | Faust et al. | |

(Continued)

FOREIGN PATENT DOCUMENTS

| | | |
|---|---|---|
| AU | 1999014696 A1 | 8/1999 |
| AU | 1999014697 A1 | 8/1999 |

(Continued)

*Primary Examiner* — Karie O'Neill Apicella
(74) *Attorney, Agent, or Firm* — Boardman & Clark LLP

(57) ABSTRACT

An electrode assembly for a high cycling battery is disclosed. The electrode assembly includes a separator envelope comprising a backweb of material. The backweb has opposing sides, a contact area including a plurality of vertical, continuous major ribs of substantially the same height spaced across the contact area and projecting from one of the opposing sides forming acid conduits therebetween. A rim area is provided on each respective end of the contact area and has a plurality of vertical shoulder ribs. The backweb of material is folded and each rim area, aligned by the folding of the backweb, at least partially secured to itself to form the separator envelope. A negative electrode is received in the separator envelope and a positive electrode is positioned adjacent to the negative electrode, separated from the negative electrode by the separator envelope. A separator and plate assembly and a lead-acid battery are also disclosed.

19 Claims, 4 Drawing Sheets

(56) References Cited

U.S. PATENT DOCUMENTS

| | | |
|---|---|---|
| 6,410,183 B2 | 6/2002 | Weerts et al. |
| 6,475,665 B1 | 11/2002 | Okamoto et al. |
| 6,641,954 B2 | 11/2003 | Weerts et al. |
| 6,844,109 B2 | 1/2005 | Xing et al. |
| 7,416,807 B2 | 8/2008 | Ohara et al. |
| 7,425,387 B2 * | 9/2008 | Bohnstedt ............... H01M 2/18 428/167 |
| 7,732,082 B2 | 6/2010 | Hayashi et al. |
| 8,071,234 B2 | 12/2011 | Okada et al. |
| 8,163,420 B2 | 4/2012 | Okada et al. |
| 8,168,321 B2 | 5/2012 | Shelekhin et al. |
| 8,241,816 B2 | 8/2012 | Sano et al. |
| 8,273,492 B2 | 9/2012 | Homma |
| 8,486,160 B2 | 7/2013 | Hwang et al. |
| 8,709,637 B2 | 4/2014 | Ahn et al. |
| 8,741,469 B2 | 6/2014 | Ahn et al. |
| 8,795,883 B2 | 8/2014 | Shin et al. |
| 8,802,269 B2 | 8/2014 | Onishi et al. |
| 2002/0034684 A1 | 3/2002 | Muller-Rinke |
| 2002/0051912 A1 * | 5/2002 | Fitter ............... H01M 10/4235 429/347 |
| 2009/0068554 A1 | 3/2009 | Johns |
| 2009/0197160 A1 | 8/2009 | Fujiwara et al. |
| 2011/0091761 A1 | 4/2011 | Miller et al. |
| 2011/0177375 A1 * | 7/2011 | Pfanner ............... H01M 2/145 429/146 |
| 2011/0318629 A1 * | 12/2011 | Ho ............... H01M 2/1606 429/144 |
| 2012/0231321 A1 | 9/2012 | Huang et al. |
| 2013/0164596 A1 | 6/2013 | Whear et al. |
| 2013/0171497 A1 | 7/2013 | Enomoto et al. |
| 2014/0014420 A1 | 1/2014 | Nakamura et al. |
| 2014/0205887 A1 | 7/2014 | Tanjo et al. |

FOREIGN PATENT DOCUMENTS

| | | |
|---|---|---|
| AU | 747268 B2 | 5/2002 |
| CN | 1166016 C | 9/2004 |
| CN | 1182603 C | 12/2004 |
| CN | 103268926 A | 8/2013 |
| CN | 103733379 A | 4/2014 |
| CN | 203536496 U | 4/2014 |
| EP | 944926 A1 | 9/1999 |
| EP | 952620 B1 | 11/2002 |
| EP | 1304755 B1 | 12/2007 |
| EP | 1999808 B1 | 11/2009 |
| EP | 1102342 B1 | 2/2012 |
| EP | 2026394 B1 | 10/2012 |
| EP | 1999805 B1 | 8/2014 |
| JP | H08273651 A | 10/1996 |
| JP | H08315849 A | 11/1996 |
| JP | 2001210302 A | 8/2001 |
| JP | 2003092098 A | 3/2003 |
| JP | 2003109573 A | 4/2003 |
| JP | 2004127628 A | 4/2004 |
| JP | 2010140772 A | 6/2010 |
| KR | 440355 B1 | 9/2004 |
| KR | 2014048311 A | 4/2014 |
| WO | WO2013152030 A1 | 10/2013 |

* cited by examiner

BATTERY ELECTRODE ASSEMBLY, SEPARATOR AND METHOD OF MAKING SAME

FIELD

The present invention relates to the field of batteries. More specifically, the present invention relates to electrode assemblies and separators for use in rechargeable batteries.

BACKGROUND

Separators are generally known in the art. Separators are used in rechargeable batteries in order to electrically isolate electrodes of opposite polarity from one another. These separators, or primary separators, are typically provided about the positive electrode or plate. This allows an ionically conductive path to be formed between the two electrodes, for example via electrolyte.

Separators are often manufactured to form a pocket which is open at the top. To form the pocket, a separator is typically folded. In some separators, the edges of the folded separator may then be connected, for example welded to one another, forming the pocket which is open at the top. To account for formation of the pocket, the separator is typically manufactured to have a length which is greater than the height of two separators.

While separators are generally known, separators have different performance requirements depending upon the end use of the rechargeable battery. For example, separators of a rechargeable battery employed in a lower cycling application, such as an automobile, may have different performance requirements than separators of a rechargeable battery employed in a high cycling application, such as in a smaller, lightweight vehicle, for example a golf car. The performance requirements are often related to separator life and/or performance.

Known separators for high cycling rechargeable batteries have various drawbacks. Among other drawbacks, known separators do not form or maintain effective acid conduits for cycling. Moreover, in electrode assemblies for high cycling batteries, the separator is often a leaf separator placed around the positive electrode. In addition, when a glass mat is used, the glass mat must face the positive plate, as it will embed itself during the life of the battery. Accordingly, the glass mat is added prior to placement of the positive electrode inside of the separator. The features of a leaf separator often present the problem of developing shorts around the separator as the plates are not fully enclosed, while enveloped separators can present problems related to acid stratification, which causes differences in acid concentrations between the top of the electrodes and the bottom of the electrodes. Therefore, a need exists for an improved electrode assembly and separator.

SUMMARY

Accordingly, an electrode assembly for a high cycling battery is disclosed. The electrode assembly includes a separator envelope comprising a backweb of material. The backweb has opposing sides, a contact area including a plurality of vertical, continuous major ribs of substantially the same height spaced across the contact area and projecting from one of the opposing sides forming acid conduits therebetween which are free from smaller ribs. A rim area is provided on each of the respective ends of the contact area. Each rim area has a plurality of vertical shoulder ribs spaced along a portion of the rim area. The backweb of material is folded and each rim area, aligned by the folding of the backweb, at least partially secured to itself to form the separator envelope. A negative electrode is received in the separator envelope and a positive electrode is positioned adjacent to the negative electrode and separated from the negative electrode by the separator envelope. Each pair of electrodes formed by the negative electrode and the positive electrode is separated by one separator which is the separator envelope.

A separator and plate assembly for a high cycling rechargeable battery is also disclosed. The separator and plate assembly includes a separator formed of a backweb of material, the backweb having opposing sides, a contact area including a plurality of vertical, continuous major ribs of substantially the same height spaced across the contact area and projecting from one of the opposing sides forming acid conduits therebetween which are free from smaller ribs. A rim area is provided on each of the respective ends of the contact area. Each rim area has a plurality of vertical shoulder ribs spaced along a portion of the rim area. The backweb of material is folded and each rim area aligned by the folding of the backweb is at least partially secured to itself to form an envelope. A negative plate is received within the envelope.

A lead-acid battery is also disclosed. The lead-acid battery includes an electrode assembly forming a battery ranging from 2 volts to 8 volts. The electrode assembly includes a separator envelope comprising a backweb of material, the backweb having opposing sides, a contact area including a plurality of vertical, continuous major ribs of substantially the same height spaced across the contact area and projecting from one of the opposing sides forming acid conduits therebetween which are free from smaller ribs. A rim area is provided on each of the respective ends of the contact area. Each rim area has a plurality of vertical shoulder ribs spaced along a portion of the rim area. The backweb of material is folded and each rim area, aligned by the folding of the backweb, at least partially secured to itself forming the separator envelope. A negative electrode is received in the separator envelope. A positive electrode is positioned adjacent to the negative electrode and separated from the negative electrode by the separator envelope. Each pair of electrodes formed by the negative electrode and the positive electrode is separated by one separator which is the separator envelope.

A method of making a high cycling rechargeable battery is further disclosed. The method includes the steps of folding a separator to form an envelope defined by the separator. The separator has a backweb of material, the backweb having a contact area including a plurality of major ribs of substantially the same height spaced across the contact area and projecting away from the backweb, and a rim area provided on either or both sides of the contact area, each rim area having a plurality of shoulder ribs spaced along a portion of each rim area. A negative electrode is inserted into the envelope formed by the separator. A positive electrode is placed upon the separator, such that the positive and negative electrodes are separated by the separator.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

As described herein, the present invention is directed to one or more embodiments of an electrode assembly and a separator for use in a rechargeable battery. The electrode assembly and separator may be used in association with high cycling rechargeable batteries, and further may be used in a 2, 4, 6, 8, and/or 12 volt rechargeable battery for use in certain vehicles. In one or more particular examples of embodiments, the electrode assembly and separator described herein are used in batteries with voltages ranging from 2 volts to 8 volts. The separator includes improvements over known separators in high cycling rechargeable batteries, including, in one example, an improved rib arrangement which improves battery life by maintaining acid conduits formed between major ribs of the separator during battery cycling. The separator may also have an increased separator thickness, as defined by the total height of each major rib. To further resolve the problem of acid stratification, the separator is enveloped about the negative electrode or plate and provided adjacent a positive electrode, collectively forming an improved electrode assembly. In addition, an improved process for manufacturing a set of electrodes of opposite polarity employing the electrode assembly and separator in a high cycling rechargeable battery is also provided.

Figure 1:
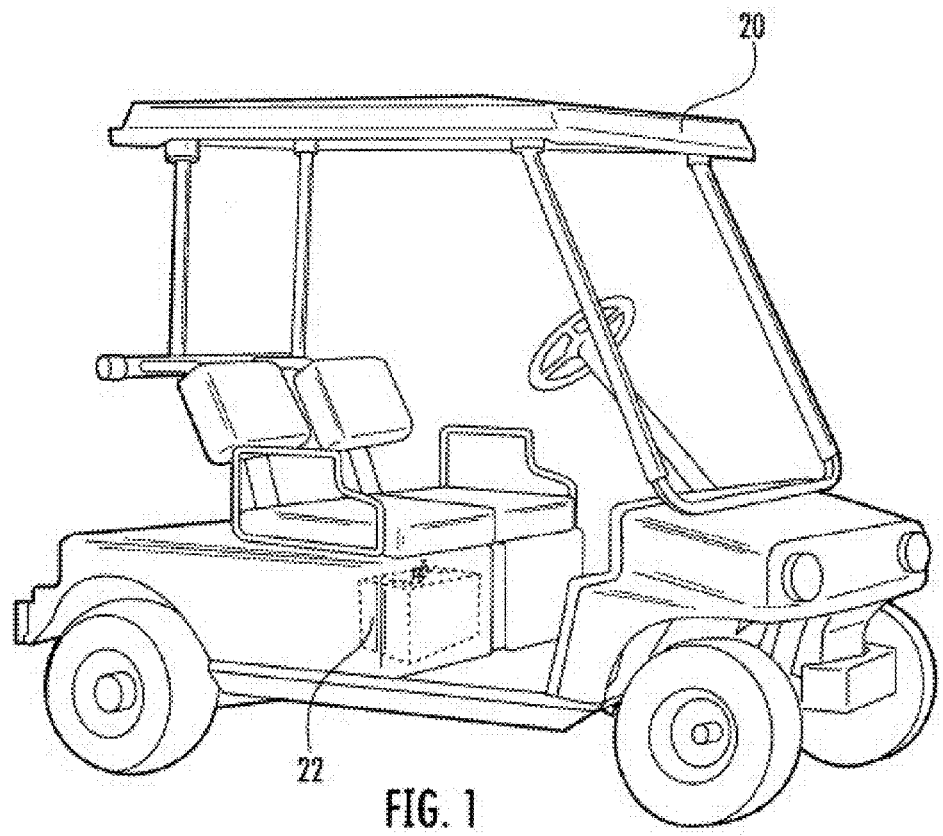
FIG. 1 is an isometric view of a vehicle including one or more examples of embodiments of a high cycling rechargeable battery incorporating the electrode assembly and separator described herein.

In reference to the Figures, one or more embodiments of an improved separator 138 for a high cycling rechargeable battery are shown. As indicated, the high cycling battery may be used with a vehicle. Accordingly, referring to FIG. 1, a vehicle 20 is shown for use with one or more examples of embodiments of a high cycling rechargeable battery 22 incorporating the electrode assembly and separator described herein. For ease of discussion, vehicle 20 is illustrated as a golf car. While the illustrations provided herein relate to a golf car, the disclosed separator may have applications not limited to a rechargeable battery for a golf car. It is contemplated that the disclosed separator may be used in high cycling batteries employed in other applications.

Battery 22 is configured to provide at least a portion of the power required for starting and/or operating vehicle 20 and/or various systems associated with vehicle 20. Examples of these systems may include, but are not limited to, starting, lighting, and/or ignition systems, as well as in some instances power delivery systems.

Figure 2:
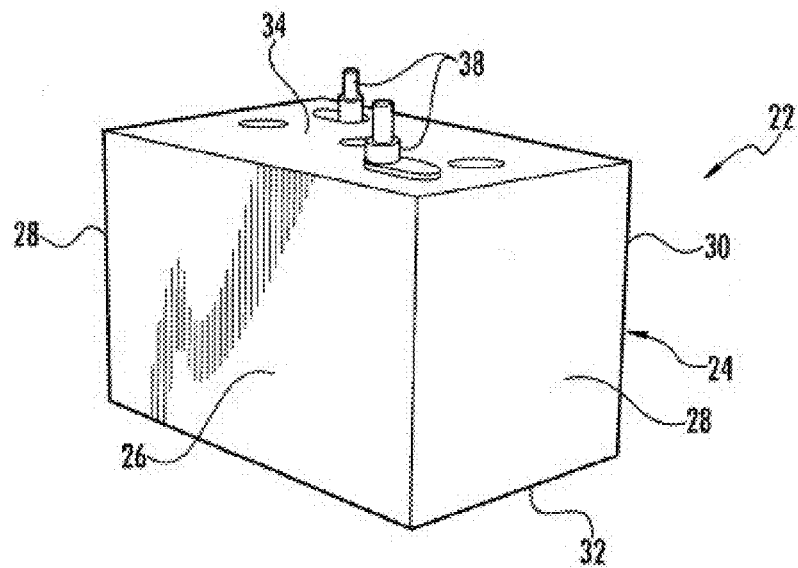
FIG. 2 is an isometric view of one or more examples of embodiments of the high cycling rechargeable battery incorporating the electrode assembly and separator described herein.

Referring now to FIG. 2, battery 22 may include a battery housing or container 24. Container 24 may be defined by a front wall 26, opposing end walls 28, a rear wall 30 and a bottom wall 32. Walls 26, 28, 30, 32 together form a compartment for receiving one or more cell or plate blocks 106 (see FIG. 3). Container 24 also includes a cover 34 which overlaps the compartment and is coupled to walls 26, 28, 30. Cover 34 may include battery terminals 38. Terminals 38 may be axially offset from one another, as illustrated in FIG. 2, or may be axially in alignment. The positioning of terminals 38 in cover 34 may be based upon a number of factors, including but not limited to, the end use of the battery, or the arrangement of connectors in the end use device for engaging terminals 38. In one or more examples of embodiments, container 24 may be made of a moldable resin. While a specific container arrangement is provided by way of example, a variety of battery container arrangements may be used without departing from the overall scope of the present invention.

Figure 3:
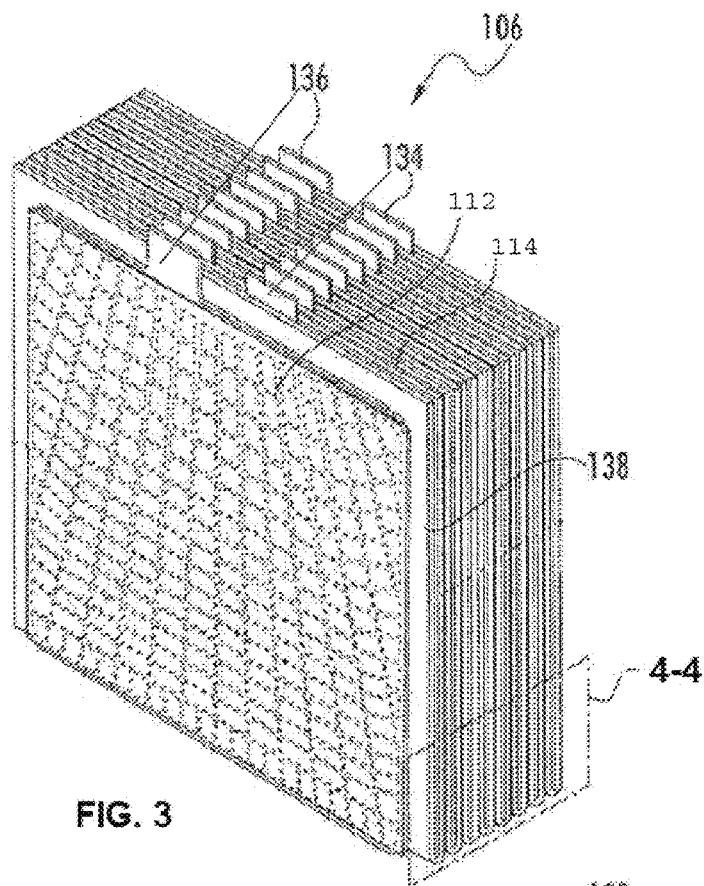
FIG. 3 is an isometric view of one or more examples of embodiments of a plate or electrode block for use in the high cycling rechargeable battery of FIG. 2.

Referring now to FIG. 3, a cell or plate block 106 or electrode block is illustrated. Each plate block 106 may include one or more positive electrodes 112 and one or more negative electrodes 114. The battery includes at least one positive plate and at least one negative plate. Each plate includes a lead or lead alloy grid that supports an electrochemically active material. For example, the positive and negative plates may be paste-type electrodes. A plate for a lead-acid battery is conventionally made by applying the active material or paste to the conductive support or lead alloy grid. In one or more examples of embodiments, the grid is a stamped grid. The stamped grid includes a frame and a current collection lug integral with the frame. The battery grid also includes grid wires provided in a grid network formed by a plurality of grid wires arranged in a pattern within the frame. The plurality of grid wires define a pattern including open areas in the grid network and within the frame. The open areas help hold the active material or paste.

Each positive electrode or plate 112 therefore may include at least one lug 134. Similarly, each negative electrode or plate 114 may include at least one lug 136. Lugs 134 of the positive plates 112 may be coupled together by a strap or intercell connector (not shown) which in turn is in electrical communication with an associated positive terminal 38.

Similarly, lugs 136 of the negative plates 114 may be coupled together by a strap or intercell connector (not shown) which in turn is in electrical communication with an associated negative terminal 38.

Figure 4:
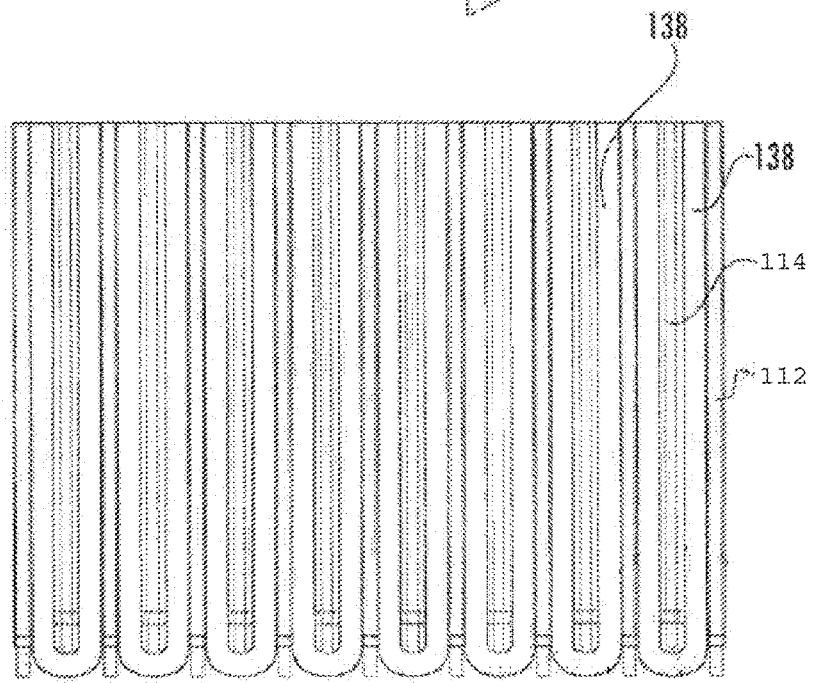
FIG. 4 is a partial cut-away view of the plate block of FIG. 3 illustrating assemblies of positive and negative plates separated by an envelope separator, and taken from section 4-4 of FIG. 3.

A separator 138 is provided between consecutive or adjacent positive and negative plates 112, 114 (see FIGS. 3 & 4). More specifically, separators 138 are arranged to wrap around a respective negative plate, forming an envelope or pocket. According to one or more examples of embodiments, a single separator 138, or primary separator, envelopes each negative plate or electrode 114 in a pair of electrodes 112, 114. In this regard, an electrode assembly is provided formed by a negative electrode 114 contained within separator 138 envelope arranged adjacent to a positive electrode 112. That is, each pair of electrodes formed by the negative electrode and the positive electrode is separated by a single separator, which separator is carried over the negative electrode. Separators 138 may be used to conductively separate positive and negative plates 112, 114 from one another. Stated otherwise, separator 138 may be provided between electrodes 112, 114 to prevent shorting or undesirable electron flow produced during the electrochemical reaction between electrodes 112, 114, among other features.

Figure 5:
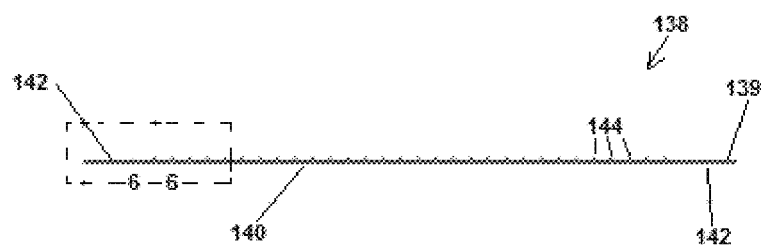
FIG. 5 is a cross-sectional view of the improved separator described herein.

Referring to FIG. 5, a cross-sectional view of the separator 138 is provided. Separator 138 includes a separator backweb 139. Separator backweb 139 extends along the entirety of the separator between opposing ends. Separator backweb 139 may include a contact area 140 bordered on at least one and preferably both sides by respective shoulder or rim areas 142. Contact area 140 is the area which contacts and may support the respective electrode. Each rim area 142 engages a related rim area or adjacent rim area 142 when the separator backweb 139 is folded. As such, adjacent rim areas 142 may be welded or connected together to form or forming the associated separator pocket or envelope (see, e.g., FIGS. 3 & 4). In particular, the backweb of material is folded and the rim areas area at least partially secured together to form an envelope or pocket.

Figure 6:
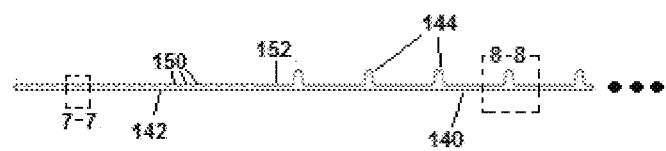
FIG. 6 is a partial cross-sectional view of the improved separator of FIG. 5 illustrating the shoulder portion and a portion of the contact area, taken from section 6-6 of FIG. 5.
Figure 8:
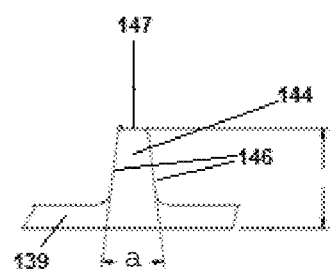
FIG. 8 is a partial cross-sectional view of the improved separator of FIG. 5 illustrating a major rib, taken from section 8-8 of FIG. 6.

Contact area 140 of separator backweb 139 may include a plurality of major ribs 144 projecting away from one side of separator backweb 139, such as is shown in FIGS. 5, 6, and 8. That is, the separator backweb 139 has opposing sides and the major ribs 144 project from one of the opposing sides. The plurality of major ribs are vertical, continuous major ribs of substantially the same height and spaced across the contact area of the backweb.

The plurality of ribs have a configuration and a rib density suitable for the purposes provided herein. As one particular example of embodiments, contact area 140 may include at least thirty (30) major ribs 144 (or more than thirty (30) major ribs), and in one particular example, at least thirty (30) major ribs 144 but less than forty (40) major ribs. The major ribs 144 in one or more examples are evenly spaced along contact area 140. The major ribs 144 are vertical continuous ribs of substantially equal height. The ribs 144 are continuous in that they extend at a substantially uniform height from one end of the separator to another. In one or more specific examples of embodiments and for purposes of illustrating relative dimensions and distances of the various components, contact area 140 may be at least approximately 132.22 mm wide (or 5.206 inches wide) as measured between respective major ribs 144 positioned at each respective end or opposing ends of contact area 140. A plurality of major ribs are spaced thereon. In one example, the plurality of major ribs may be evenly spaced. In this example of embodiments, by way of illustration only, major ribs 144 may be spaced at least approximately 4.56 mm (or 0.180 inches) apart across contact area 140 with the example dimension set forth above. To this end, the separator 138 may have a major rib density (measured by number of ribs by width of contact area) which is greater than traditional separators. Furthermore, in one or more examples of embodiments, no mini-ribs or smaller ribs are provided between the respective major ribs. Thus, the areas formed between the major ribs, discussed in further detail herein as acid conduits, are free of smaller ribs.

In one or more examples of embodiments, the plurality of major ribs are of substantially the same height. In one or more specific examples of embodiments and for purposes of illustrating relative dimensions and distances of the various components, separator backweb 139 may generally have a thickness of approximately 0.30 mm (or 0.012 inches) or greater. Each major rib 144 extends at least approximately 0.97 mm (or 0.038 inches) away from separator backweb 139, and in particular, from the surface of the separator backweb 139. Stated otherwise, each major rib 144 has a total height, which includes the height of the major rib and thickness of the separator backweb, of at least or greater than approximately 1.27 mm (or 0.05 inches).

In the illustrated example, the plurality of major ribs may also have the same general rib profile. For example, each major rib 144 may have a wedge cross-sectional shape. As an illustrative example, opposing sides 146 of each major rib 144 define an angle (a) (see FIG. 8) between sides 146 of the major rib 144. In one particular example, angle (a) is an approximate fourteen degree angle between sides 146. Each major rib 144 may also include a flattened top portion 147 which separates opposing sides 146. In one specific example, top portion 147 is approximately 0.38 mm (or 0.015 inches) wide.

Figure 10:
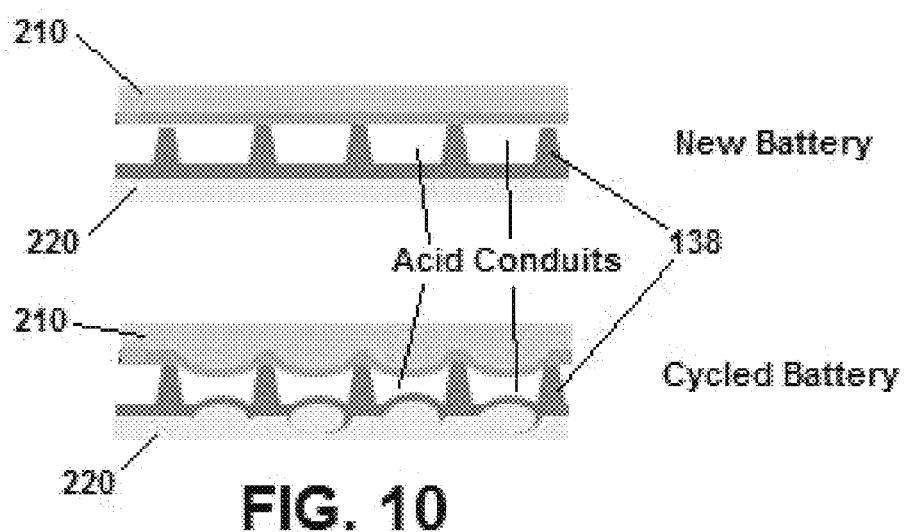
FIG. 10 is a partial cross-sectional view of a new and cycled battery having a positive electrode separated by a negative electrode with the improved separator, and which illustrates a reduction of acid conduit collapse during battery cycling.

According to one or more examples of embodiments, and as shown in FIG. 10, major ribs 144 of separator 138 form acid conduits or channels in an electrode assembly, as well as an assembled battery electrode or plate block 106. That is, areas are formed between the major ribs 144 of the separator which form acid conduits.

In one or more examples of embodiments, the backweb 139 has opposing sides and ribs 144 (as well as shoulder ribs 150) project from only one of the opposing sides. Accordingly, one side of the separator 138 may be free from ribs of any type. To this end, acid conduits may be formed on one side of the backweb 139.

Separator 138 may also have an increased thickness. The increased thickness is due to continuous major ribs of increased height. While the thickness is increased, the thickness of the separator backweb 139 does not change. Accordingly, the thickness increase is measured by the total height of each major rib 144 (inclusive of the separator backweb thickness plus the major rib height). By increasing the thickness of separator 138, as measured by the total height of each major rib 144, the acid conduits provided therebetween are larger in size, further improving acid flow in the acid conduits during battery cycling. In one particular illustrative example of embodiments, the total height may be increased to greater than 1.27 mm (0.05 inches), and more specifically to approximately 1.524 mm (0.06 inches), and more specifically to approximately 1.778 mm (0.07 inches). It should be appreciated that in this example, while the thickness is increased, the thickness of the separator backweb 139 does not change, and may be maintained at 0.30 mm (or 0.012 inches).

While specific examples of embodiments are given herein, it is appreciated that variations thereon accomplishing the purposes set forth herein may be used in place of the noted values, shapes, and dimensions. For example, the thickness of a separator may vary depending upon the type of battery in which it is used, and/or the height of each rib and spacing of each rib may vary depending upon electrode or plate spacing requirements.

Figure 7:
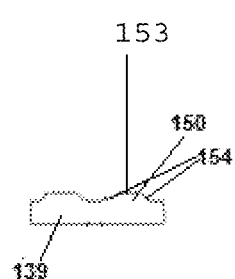
FIG. 7 is a partial cross-sectional view of the improved separator of FIG. 5 illustrating consecutive shoulder ribs, taken from section 7-7 of FIG. 6.

Rim area 142 of the separator backweb 139 may include a plurality of shoulder ribs 150 spaced along and projecting away from one side of separator backweb 139 (see FIGS. 5, 6, and 7). Preferably, shoulder ribs 150 project away from separator backweb 139 or separator surface on the same side as major ribs 144. As indicated, rim area 142 may include a plurality of shoulder ribs. In one illustrative example, at least nineteen (19) shoulder ribs 150 (or more than nineteen (19) shoulder ribs) are provided in rim area 142. In one particular example, the plurality of shoulder ribs 150 may be evenly spaced along a portion of rim area 142. The shoulder ribs 150 form a corresponding shoulder rib density measured by the number of shoulder ribs 150 across the rim area 142. In one or more examples of embodiments, the shoulder ribs 150 extend vertically. The plurality of shoulder ribs 150 may be separated or offset from contact area 140 by an un-ribbed portion 152. While specific examples of embodiments are given, it is appreciated that variations thereon accomplishing the purposes set forth herein may be used in place of the noted values, shapes, and dimensions.

In one or more specific examples of embodiments and for purposes of illustrating relative dimensions and distances of the various components, each rim area 142 may be at least approximately 18.39 mm wide (or 0.724 inches wide) as measured between an outer edge surface of separator backweb 139 and the respective first major rib 144 provided between rim area 142 and contact area 140. In one or more examples of embodiments, un-ribbed portion 152 of rim area 142 may be at least approximately 3.12 mm wide (or 0.123 inches wide); while the portion of rim area 142 having the plurality of shoulder ribs 150 may be at least approximately 14.86 mm wide (or 0.585 inches wide). The width of the un-ribbed portion 152 may be any suitable width. In one specific example, un-ribbed portion 152 may have a width which is less than the width provided between consecutive major ribs 144. In one or more examples of embodiments discussed herein, shoulder ribs 150 may be spaced at least approximately 0.83 mm (or 0.033 inches) apart from one another, measured peak to peak, across the portion of rim area 142 having the plurality of shoulder ribs 150. In one or more examples of embodiments, each valley between the consecutive shoulder ribs 150 may be at least approximately 0.17 mm (or 0.007 inches). The shoulder ribs 150 may be provided with a similar profile. For example, each shoulder rib 150 may have a flattened top portion 153 which separates opposing sides 154 of the rib. In one or more examples of embodiments, top portion 153 may be at least approximately 0.254 mm (or 0.010 inches) wide. While specific examples of embodiments are given, it is appreciated that variations thereon accomplishing the purposes further set forth herein may be used in place of the noted values, shapes, and dimensions.

The thickness of separator backweb 139 in the un-ribbed portion 152 may be approximately the same as the thickness of separator backweb 139 in the area between consecutive major ribs 144. Further, each shoulder rib 150 may be shorter or of smaller thickness than the major ribs. In one illustrative example, the shoulder ribs 150 may extend approximately 0.10 mm (or 0.004 inches) away from separator backweb 139 or separator backweb surface, for a total height of approximately 0.40 mm (or 0.016 inches), the total height being defined by the separator backweb approximate thickness of 0.30 mm (or 0.012 inches) plus the height of the shoulder rib 150 from the separator backweb edge or surface of approximately 0.10 mm (or 0.004 inches). In one or more further examples of embodiments, the total height of the major ribs may be at least three times the height of the shoulder ribs. In one or more further examples of embodiments, the total height of the major ribs may be at least four times the thickness (e.g., height) of the backweb or separator backweb material. While specific examples of embodiments are given, it is appreciated that variations thereon accomplishing the purposes set forth herein may be used in place of the noted values, shapes, and dimensions.

Figure 9:
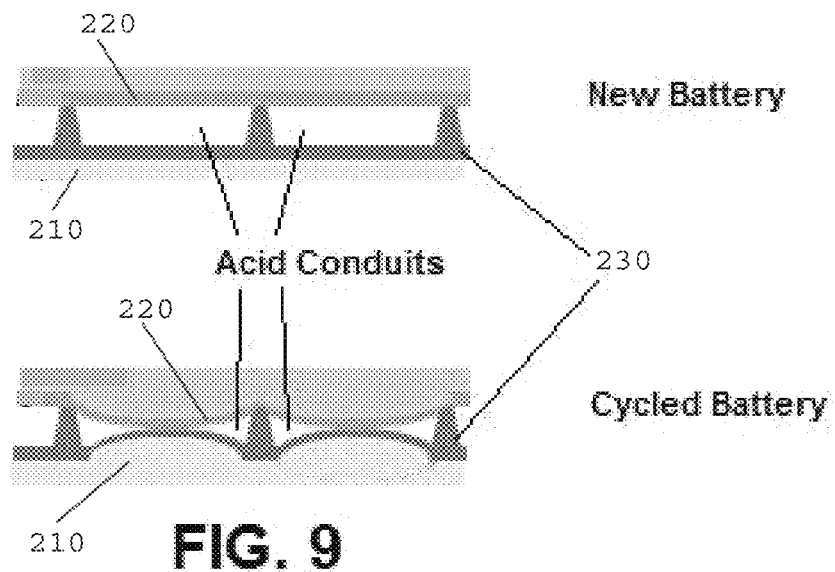
FIG. 9 is a partial cross-sectional view of a new and cycled battery having a positive electrode separated by a negative electrode with a known prior art separator on the positive electrode, and which illustrates typical acid conduit collapse during battery cycling.

As described herein, in one particular example of embodiments the improved separator 138 has a plurality of major ribs 144 of substantially the same height spaced across the contact area of the backweb. The rib configuration of separator 138 and use on a negative plate provides certain advantages over known separators. An example of which is shown in reference to and comparison of FIG. 9 and FIG. 10. FIG. 9 illustrates a segment of an electrode pair including a known or prior art separator around the positive electrode in both a new battery and a cycled battery, while FIG. 10 illustrates an electrode pair including separator 138 enveloped on a negative electrode in both a new battery and a cycled battery. As shown in FIG. 9, positive plate 210 is separated from negative plate 220 by the known separator 230. Referring to FIG. 9, as the battery is cycled, acid conduits or channels, defined by the area between major ribs of the separator, begin to collapse, reducing acid flow and in turn reducing battery life. In comparison, as illustrated in FIG. 10, the electrode assembly and separator 138 having the rib configuration described herein advantageously keeps acid conduits open during cycling, providing sufficient area for acid circulation. The envelope separator 138 on the negative battery electrode helps alleviate or reduces development of acid stratification, assisting in maintaining a uniform acid concentration from the top of the electrodes to the bottom of the electrodes. This in turn improves battery cycle life and battery capacity retention. The rib configuration of the separator 138 also retards paste growth. In addition, a separator 138 having the rib configuration set forth herein increases support or compression upon a glass mat when used as well as the plate(s), maintaining battery paste adhesion for high cycling applications, and reducing battery paste shedding and/or mossing. Further, the rib configuration of separator 138 reduces separator deformation. In addition, separator 138 provides the necessary rim area width required for manufacturability, as well as shoulder ribs, while incorporating the advantages described herein.

Separator 138 may be composed of any suitable material accomplishing the purposes set forth herein. A common separator material is typically micro-porous to allow the through passage of ions from the positive and negative electrodes. Separator backweb may generally have a substantially uniform thickness and a substantially uniform pore distribution. The pore distribution helps ensure an overall uniform current density across the electrodes during operation, thereby helping achieving a uniform charging and discharging of the electrodes and maximum battery efficiency. The separator material may be constructed of a variety of now known or future developed materials. Example materials may include polyolefin, rubber, phenol-formaldehyde resorcinol, glass mat, micro-porous poly-vinyl chloride (PVC), and sintered PVC. In some embodiments, the separator may also include an inert filler material, as well as optionally any known or later-developed wetting agents (e.g. sodium alkyl benzene sulfonate, sodium lauryl sulfate, dioctyl sodium sulfosuccinate, and isoctyl phenyl polyethoxy ethanol) to enhance the wetability of the filler. In some embodiments, the separator may also include a plasticizer, a stabilizer, and/or an antioxidant. The separator ribs may be formed of the same or differing material as the separator backweb.

The separator 138 may be produced by a process that generally comprises blending a composition of the materials described herein, and forming the composition into sheet form. Separators 138 may be made in continuous lengths and rolled, subsequently cut and folded for example as shown in the figures, and sealed along one or more of their edges to form pouches or envelopes that receive the negative battery plate. Rim areas are aligned by folding of the separator. The ribs described herein may be provided in any number of ways, and preferably prior to forming the envelope. For example, the ribs may be formed by extrusion (either unitarily with the sheet or separately). The ribs may also be formed by grooving or embossing. When ribs are molded separately, they may be bonded or otherwise coupled to the sheet or backweb by any number of methods known in the art including heat sealing or by an adhesive. While specific examples are provided the invention is not limited thereto.

An electrode 112, 114 for a lead-acid battery is conventionally made by applying active material or paste to a conductive support such as a lead alloy grid. The grids may be produced using other known or later-developed processes. In various embodiments, the grids with active material thereon are fed to a divider where the strip is cut into plates or electrodes. Plates cut from the strip may be flattened or otherwise modified to help smooth out any uneven regions of paste. In various embodiments, the plates pass (e.g. on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

After curing, the electrodes 112, 114 are assembled into batteries. Groupings of individual battery electrodes may be assembled, enveloped, interleaved or otherwise separated with separator material, and provided together to form electrode or plate sets. That is, in one or more examples of embodiments, every other electrode (namely, the negative electrode) in the battery set is inserted into a battery separator provided in the form of an envelope. The envelope acts as a separator between the electrode in the envelope and the adjoining electrodes in the battery set.

In a typical manufacturing process for a high cycling battery, a separator is a leaf separator provided about the positive electrode or plate. In batteries which include a glass mat, and more specifically a coarse glass mat, the additional step of first applying the glass mat in the positive electrode occurs prior to placement of positive electrode into the pocket of separator. As previously indicated, to further resolve the problem of acid stratification, which causes differences in acid concentrations between the top of the electrodes and the bottom of the electrodes, separator 138 is deployed in association with an improved assembly. As discussed herein the improved assembly, separator 138 envelopes about the negative electrode or plate 114. Stated otherwise, the negative electrode 114 is received within the pocket formed by separator 138. In the process of forming the assembly, following insertion of the negative electrode 114 into the separator envelope 138, the positive electrode 112 is then placed upon, adjacent, or in proximity to separator 138 which contains negative electrode 114. In batteries having a glass mat, an additional step of gluing, or adhering the glass mat to the separator and facing the positive plate in the assembly occurs prior to placement of the positive electrode 112 in proximity to separator 138 which contains negative electrode 114. Unlike a typical battery with a glass mat, the glass mat will not be retained with positive electrode 112 in a separator. Instead, it is separated therefrom. As a result of the positioning of the separator 138 envelope around the negative electrode, the improved assembly and process alleviates or reduces development of acid stratification, assisting in maintaining a uniform acid concentration from the top of the electrodes to the bottom of the electrodes.

The electrode sets or plate blocks 106 are assembled in the container to help form a battery. During assembly, the positive lugs of the battery electrodes are coupled together and the negative lugs of the battery electrodes are coupled together. This is typically accomplished using intercell connectors such as cast-on straps formed by taking assembled battery stacks or plate blocks, inverting them, and dipping the lugs into molten lead provided in a mold. To permit current to follow throughout the battery, cast-on straps of blocks are joined or coupled. Moreover, terminal electrodes are provided which extend through the cover or casing to permit electrical contact with a vehicle's electrical system or other system requiring or intended to use battery power.

In various embodiments, the battery container 24, including the cover, is provided containing the battery cells and is submerged in acidic electrolyte fluid in order to fill the battery housing with electrolyte fluid through the fill tube holes in the battery cover. After filling the battery container with electrolyte fluid, the battery is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

Following the initial wash, the batteries are electrochemically formed by passage of current to convert the lead sulfate or basic lead sulfate(s) to lead dioxide (positive electrodes) or lead (negative electrodes). This is referred to as the "formation" process.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. An electrode assembly for a high cycling battery comprising:
a separator envelope comprising a backweb of material, the backweb having opposing sides, a contact area including a plurality of vertical, continuous major ribs of substantially the same height spaced evenly across the contact area and projecting from one of the opposing sides forming acid conduits therebetween which are free from smaller ribs, and a rim area provided on each of the respective ends of the contact area, each rim area having a plurality of vertical shoulder ribs spaced along a portion of the rim area, wherein the backweb of material is folded and each rim area aligned by the folding of the backweb at least partially secured to itself to form the separator envelope, and wherein each major rib is spaced apart a distance equaling at least approximately 4.5 mm;
a negative electrode received in the separator envelope; and
a positive electrode positioned adjacent to the negative electrode and separated from the negative electrode by the separator envelope; wherein each pair of electrodes formed by the negative electrode and the positive electrode is separated by one separator which is the separator envelope;
and wherein a total height of each major rib from the plurality of major ribs, measured by combination of a height of the major rib and thickness of the backweb, is at least four times a height of the backweb of material.

2. The electrode assembly of claim 1, wherein the major ribs and shoulder ribs are provided on only one of the opposing sides of the backweb.

3. The electrode assembly of claim 1, wherein each major rib from the plurality of major ribs has a total height, measured by combination of a height of the major rib and thickness of the backweb, of at least 0.05 inches.

4. The electrode assembly of claim 1, wherein the plurality of major ribs comprises at least thirty major ribs.

5. The electrode assembly of claim 1, wherein the plurality of shoulder ribs are evenly spaced along the portion of the rim area.

6. The electrode assembly of claim 1, wherein the plurality of vertical shoulder ribs are separated from the contact area by an un-ribbed portion having a first width which is less than a second width provided between consecutive major ribs.

7. The electrode assembly of claim 1, wherein the plurality of shoulder ribs comprises approximately nineteen shoulder ribs.

8. The electrode assembly of claim 1, wherein a total height of each major rib from the plurality of major ribs, measured by combination of a height of the major rib and thickness of the backweb, is at least three times a height of a rib from the plurality of shoulder ribs.

9. The electrode assembly of claim 1, further comprising a glass mat adhered to the separator envelope.

10. A lead-acid battery having the electrode assembly of claim 1.

11. A golf car having the lead-acid battery of claim 9.

12. An assembly for a high cycling rechargeable battery comprising:
a separator comprising a backweb of material, the backweb having opposing sides, a contact area including a plurality of vertical, continuous major ribs of substantially the same height spaced across the contact area and projecting from one of the opposing sides forming acid conduits therebetween which are free from smaller ribs, and a rim area provided on each of the respective ends of the contact area, each rim area having a plurality of vertical shoulder ribs spaced along a portion of the rim area, wherein there are approximately 4 to 6 major ribs per inch across the contact area and the plurality of major ribs is at least thirty major ribs;

wherein the backweb of material is folded and each rim area aligned by the folding of the backweb is at least partially secured to itself to form an envelope; and a negative plate received within the envelope.

13. The assembly of claim 12, wherein each major rib from the plurality of major ribs, measured by combination of a height of the major rib and thickness of the backweb, has a total height of at least 0.05 inches.

14. The assembly of claim 12, wherein a total height of each major rib from the plurality of major ribs, measured by combination of a height of the major rib and thickness of the backweb, is at least three times a height of a shoulder rib from the plurality of shoulder ribs.

15. The assembly of claim 12, wherein a total height of each major rib from the plurality of major ribs, measured by combination of a height of the major rib and thickness of the backweb, is at least four times a height of the backweb of material.

16. The assembly of claim 12, wherein the plurality of vertical shoulder ribs are separated from the contact area by an un-ribbed portion.

17. A lead-acid battery comprising:

an electrode assembly forming a battery, the electrode assembly including:

a separator envelope comprising a backweb of material, the backweb having opposing sides, a contact area including a plurality of vertical, continuous major ribs of substantially the same height each evenly spaced a spacing width across the contact area and projecting from one of the opposing sides forming acid conduits therebetween which are free from smaller ribs, and a rim area provided on each of the respective ends of the contact area, each rim area having a plurality of vertical shoulder ribs spaced along a portion of the rim area, wherein the backweb of material is folded and each rim area aligned by the folding of the backweb at least partially secured to itself forming the separator envelope, wherein the height of each major rib from the plurality of major ribs is approximately ⅕ the spacing width, the plurality of major ribs comprising at least thirty major ribs;

a negative electrode received in the separator envelope; and a positive electrode positioned adjacent to the negative electrode and separated from the negative electrode by the separator envelope; wherein each pair of electrodes formed by the negative electrode and the positive electrode is separated by one separator which is the separator envelope.

18. A golf car comprising the lead-acid battery of claim 17.

19. The electrode assembly of claim 1, wherein each major rib is spaced apart a distance equaling at least approximately 3.5 percent of the contact area.

* * * * *

UNITED STATES PATENT AND TRADEMARK OFFICE
CERTIFICATE OF CORRECTION

PATENT NO. : 10,230,088 B1
APPLICATION NO. : 14/609936
DATED : March 12, 2019
INVENTOR(S) : Liedhegner et al.

It is certified that error appears in the above-identified patent and that said Letters Patent is hereby corrected as shown below:

On the Title Page

Item (72), Column 1, Lines 2-3, delete "Soracaba (BR);" and insert -- Sorocaba (BR); --, therefor.

Item (72), Column 1, Lines 3-4, delete "Monterrey Neuvo Leon (MX);" and insert -- Monterrey, Nuevo León (MX); --, therefor.

In the Claims

Column 12, Line 53, Claim 11, delete "claim 9," and insert -- claim 10. --.

Signed and Sealed this
Twenty-fourth Day of March, 2020

Andrei Iancu
*Director of the United States Patent and Trademark Office*